(12) United States Patent
Huck

(10) Patent No.: US 8,263,185 B2
(45) Date of Patent: Sep. 11, 2012

(54) BONDING AGENT CONTAINING A SILANE REACTION PRODUCT

(75) Inventor: Wolf-Rudiger Huck, Zurich (CH)

(73) Assignee: Sika Technology AG, Baar (CH)

( * ) Notice: Subject to any disclaimer, the term of this patent is extended or adjusted under 35 U.S.C. 154(b) by 199 days.

(21) Appl. No.: 12/312,579

(22) PCT Filed: Nov. 20, 2006

(86) PCT No.: PCT/EP2006/068680
§ 371 (c)(1),
(2), (4) Date: Sep. 28, 2009

(87) PCT Pub. No.: WO2008/061556
PCT Pub. Date: May 29, 2008

(65) Prior Publication Data
US 2010/0323203 A1 Dec. 23, 2010

(51) Int. Cl.
*C09J 11/06* (2006.01)
(52) U.S. Cl. ........ 427/387; 428/447; 428/448; 428/428; 528/30; 528/38; 528/40; 523/118
(58) Field of Classification Search ...................... 528/30
See application file for complete search history.

(56) References Cited

U.S. PATENT DOCUMENTS

| 4,233,428 A | 11/1980 | Endo | |
|---|---|---|---|
| 4,562,237 A * | 12/1985 | Okuno et al. | 528/17 |
| 5,336,748 A | 8/1994 | Castellucci | |
| 7,507,443 B2 * | 3/2009 | Trabesinger et al. | 427/387 |
| 2002/0037417 A1 * | 3/2002 | Sato et al. | 428/447 |
| 2005/0171318 A1 | 8/2005 | Okuhira et al. | |

FOREIGN PATENT DOCUMENTS

| CA | 2560989 A1 | | 10/2005 |
|---|---|---|---|
| EP | 0 482 480 B1 | | 1/1995 |
| EP | 1 172 424 A1 | | 1/2002 |
| EP | 1 582 571 A1 | | 10/2005 |
| JP | 9-132758 | * | 5/1997 |
| WO | WO 2004/007585 | * | 1/2004 |
| WO | WO 2005/059056 A1 | | 6/2005 |

OTHER PUBLICATIONS

Machine-generated translation of JP 9-132758 into English.*

* cited by examiner

*Primary Examiner* — Marc Zimmer
(74) *Attorney, Agent, or Firm* — Oliff & Berridge, PLC

(57) ABSTRACT

The invention relates to compositions comprising or consisting of a reaction product obtained from a reaction mixture of aminosilane of formula (I), a mecaptosilane of formula (II) and an epoxysilane of formula (III). Said compositions are suitable as bonding agents, especially in the form of primers. The compositions are highly adhesive and especially suitable for low-temperature applications and especially for sticking glass together.

30 Claims, No Drawings

BONDING AGENT CONTAINING A SILANE REACTION PRODUCT

TECHNICAL FIELD

The present invention relates to the field of adhesion promoters, especially of primer compositions.

STATE OF THE ART

Adhesive bonding is a widely used bonding technology. Owing to the large number of possible substrates which are adhesively bonded to one another, there are regularly substrates which can build up inadequate adhesion, if any, with certain adhesives. In order to improve the adhesion of adhesives and sealants on these substrates, adhesion promoters have already been used for a long time, especially in primers.

the adhesion promoters used are typically silanes, in many cases also as mixtures. WO-A-2005/059056 describes, for example, a primer which, as well as an organotitanate and an organic solvent, comprises a mercaptosilane and a polyaminosilane and secondary aminosilane.

It is also known that adducts of aminosilanes and epoxy silanes can be used. Such adducts as a constituent of primers are described, for example, in U.S. Pat. No. 5,336,748 and EP-A-1 172 424.

The prior art adhesion promoters, however, especially in relation to moisture-curing one-component polyurethane adhesives, frequently have adhesion problems problem at a low application temperature.

SUMMARY OF THE INVENTION

It is therefore an object of the present invention to provide adhesion promoters which have good adhesion of one-component moisture-curing polyurethane adhesives, especially to glass and glass ceramics, and especially at low application temperatures.

It has now been found that, surprisingly, the compositions as claimed in claim 1 can achieve this object.

The compositions are suitable especially as primers for one-component moisture-curing polyurethane adhesives and are used advantageously for the adhesive bonding of glass and glass ceramic. They have been found to be particularly suitable in use as primers for glazing of modes of transport, especially of road vehicles. Particularly surprisingly, they exhibit improved low-temperature adhesion and are therefore useable particularly efficiently for glazing repairs, which are frequently carried out outdoors at any time of year.

Further advantageous embodiments of the invention are the subjects of further independent and dependent claims.

Ways of Performing the Invention

The invention firstly provides compositions as claimed in claim 1.

Such compositions consist comprise at least one reaction product obtained from a reaction mixture comprising at least one aminosilane of the formula (I)

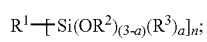  (I)

at least one mercaptosilane of the formula (II)

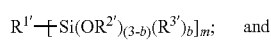  and  (II)

at least one epoxy silane of the formula (III)

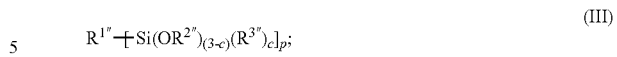  (III)

or they consist of at least one reaction product of this type.

$R^1$ here is an n-valent organic radical with at least one primary and/or secondary amino group. $R^{1'}$ is an m-valent organic radical with at least one mercapto group. $R^{1''}$ is a p-valent organic radical with at least one epoxy group. In addition, $R^2$, $R^{2'}$ and $R^{2''}$ are each independently an alkyl group having 1 to 4 carbon atoms, and $R^3$, $R^{3'}$ and $R^{3''}$ are each independently H or an alkyl group having 1 to 10 carbon atoms. Finally, a, b and c are each independently 0, 1 or 2 and n, m and p are each independently 1, 2, 3 and 4.

The aminosilane, mercaptosilane and epoxy silane may thus have one or more silane groups.

In a preferred embodiment, a is 0 and $R^2$ is methyl or ethyl. Additionally preferably, b is 0 and $R^{2'}$ is methyl or ethyl. Additionally preferably, c is 0 and $R^{2''}$ is methyl or ethyl.

More preferably, a, b and c are each 0, and $R^2$, $R^{2'}$ and $R^{2''}$ are each methyl or ethyl, especially methyl.

The indices m and p are preferably each 1 and the index n is 1 or 2.

The term "organoalkoxysilane" or "silane" for short in the present document denotes compounds in which at least one alkoxy group, typically two or three alkoxy groups, is/are firstly bonded directly to the silicon atom (via an Si—O bond), and which secondly have at least one organic radical bonded directly to the silicon atom (via an Si—C bond) and do not have any Si—O—Si bonds. Correspondingly, the term "silane group" denotes the silicon-containing group bonded to the organic radical of the organoalkoxysilane. The organoalkoxysilanes, or silane groups thereof, have the property of being hydrolyzed on contact with moisture. This forms organosilanols, i.e. organosilicon compounds containing one or more silanol groups (Si—OH groups) and, by subsequent condensation reactions, organosiloxanes, i.e. organosilicon compounds containing one or more siloxane groups (Si—O—Si groups).

Terms such as "aminosilane", "epoxy silane" and "mercaptosilane" denote silanes which have the corresponding functional group (primary amino, secondary amino or tertiary amino group, —SH, COC).

The aminosilane of the formula (I) preferably has at least one primary and/or secondary amino group and is preferably an aminosilane of the formula (IV), (V), (VI) or (VII):

  (IV)

  (V)

  (VI)

  (VII)

where $R^4$ is a linear or branched alkylene group having 1 to 6 carbon atoms, especially propylene.

Examples of such aminosilanes of the formula (IV), (V), (VI) or (VII) are 3-aminopropyltrimethoxysilane, 3-aminopropyldimethoxymethylsilane, 3-amino-2-methylpropyltrimethoxysilane, 4-aminobutyltrimethoxysilane, 4-aminobutyl-dimethoxymethylsilane, 4-amino-3-methylbutyltrimethoxysilane, 4-amino-3,3-dimethylbutyltrimethoxysilane, 4-amino-3,3-dimethylbutyldimethoxymethyl-silane, 2-aminoethyltrimethoxysilane, 2-aminoethyldimethoxymethylsilane, aminomethyltrimethoxysilane, aminomethyldimethoxymethylsilane, amino-methylmethoxydimethylsilane, N-(2-aminoethyl)-3-aminopropyltrimethoxy-silane, 3-[2-(2-aminoethylamino)ethylamino]propyltrimethoxysilane, N-(2-aminoethyl)-3-aminopropyltrimethoxysilane, bis(trimethoxysilylpropyl)amine, and the analogs thereof with ethoxy or isopropoxy groups instead of the methoxy groups on the silicon.

It has been found that secondary aminosilanes are more suitable than primary aminosilanes.

Particularly suitable aminosilanes have been found to be those of the formula (IV), (V), (VI) or (VII) in which $R^4$ is propylene, a is 0 and $R^2$ is methyl or ethyl. Most preferred are the aminosilanes which are selected from the group consisting of 3-aminopropyltrimethoxysilane, N-(2-aminoethyl)-3-aminopropyltrimethoxysilane and bis(trimethoxysilylpropyl)amine.

The mercaptosilane of the formula (II) is preferably a mercaptosilane of the formula (VIII):

(VIII)

where $R^{4'}$ is a linear or branched alkylene group having 1 to 6 carbon atoms, especially propylene.

Particularly suitable mercaptosilanes have been found to be those of the formula (VIII) in which $R^{4'}$ is propylene, b is 0 and $R^{2'}$ is methyl or ethyl. Particularly preferred mercaptosilanes are considered to be 3-mercaptopropyl-trimethoxysilane and 3-mercaptopropyltriethoxysilane.

The epoxy silane of the formula (III) is preferably an epoxy silane of the formula (IX) or (XI):

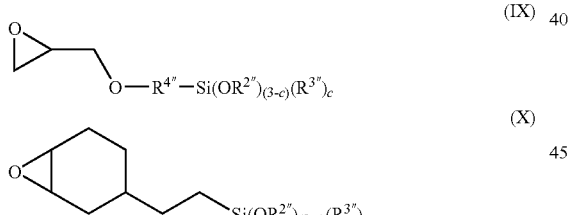

where $R^{4''}$ is a linear or branched alkylene group having 1 to 6 carbon atoms, especially propylene.

Particularly suitable epoxy silanes have been found to be those of the formula (IX) or (X) in which $R^{4''}$ is propylene, c is 0 and $R^{2''}$ is methyl or ethyl. The most preferred epoxy silanes are considered to be 2-(3,4-epoxycyclo-hexyl)ethyltrimethoxysilane, 2-(3,4-epoxycyclohexyl)ethyltriethoxysilane, 3-glycidyloxypropyltriethoxysilane and 3-glycidyloxypropyltrimethoxysilane.

The epoxy silane preferably bears a glycidyloxy group. Preferred epoxy silanes are considered to be 3-glycidyloxypropyltriethoxysilane and 3-glycidyl-oxypropyltrimethoxysilane. The most preferred epoxy silane is 3-glycidyloxypropyltrimethoxysilane.

The reaction mixture of aminosilane of the formula (I), mercaptosilane of the formula (II) and epoxy silane of the formula (III) forms a reaction product. This is evident firstly from the exothermicity and secondly from a change in the IR spectra. Since some of the reactions which proceed are very complex, a statement about the exact structures formed in the reaction mixture is extremely difficult. Typically, the reaction forms structures of the formula (XI) and/or (XII).

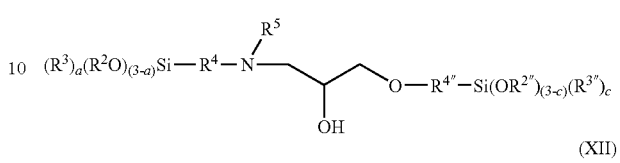

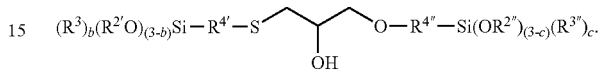

In these formulae, $R^5$ is H, a $C_1$-$C_{20}$-alkyl, cycloalkyl or aryl radical, or a radical of the formula $-R^4-Si(OR^2)_{(3-a)}(R^3)_a$, and $R^4$ and $R^{4''}$ are each independently a linear or branched alkylene group having 1 to 6 carbon atoms, especially propylene.

Typically, mercaptosilane and epoxy silane react more rapidly than epoxy silane and aminosilane. The first reaction results in a structural element of the formula (XIII) and the second reaction in a structural element of the formula (XIV)

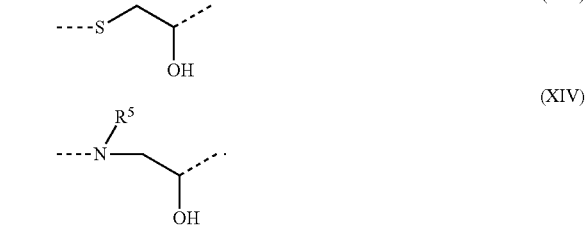

When the aminosilane is a primary aminosilane, the structural element of the formula (XV) sometimes also forms.

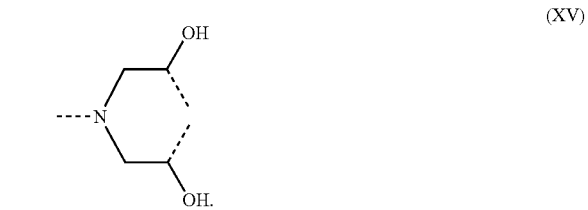

These structural elements of the formulae (XIII), (XIV) and (XV) may also be present simultaneously.

The reaction product is obtained from a reaction mixture comprising aminosilane, epoxy silane and mercaptosilane.

The epoxy silane of the formula (III) is preferably used in a substoichiometric amount in relation to the mercaptosilane of the formula (II).

In one embodiment, the aminosilane of the formula (I), the mercaptosilane of the formula (II) and the epoxy silane of the formula (III) are used in such a ratio that the number of epoxy groups is equal to or greater than the sum of the number of mercapto groups and the number of primary amino groups.

Preferably, the total amount of mercaptosilane of the formula (II) and aminosilane of the formula (I) is not stoichiometric relative to the epoxy silane of the formula (III). More particularly, this ratio is more than 2 or less than 0.5.

The aminosilane of the formula (I) and the mercaptosilane of the formula (II) are preferably initially charged, and then the epoxy silane of the formula (III) is added. However, it may also be advantageous first to initially charge the epoxy silane of the formula (III) and then to add the aminosilane of the formula (I) and the mercaptosilane of the formula (II) separately from one another or together.

The addition is effected in each case with intensive stirring.

The composition may optionally have further constituents. However, such further constituents should not impair the storage stability of the composition. As additional constituents are, for example, solvents, inorganic fillers, catalysts and stabilizers, surfactants, acids, dyes, pigments and further adhesion promoter substances.

It has been found to be particularly advantageous when the composition comprises a solvent. Firstly, especially suitable solvents are organic solvents, in particular those having a boiling point below 100° C. Suitable organic solvents of this kind are especially hydrocarbons, ketones, carboxylic esters or alcohols. Examples thereof are hexane, heptane, methyl ethyl ketone, acetone, butyl acetate, ethyl acetate, methanol, ethanol, propanol, isopropanol or butanol.

Another suitable solvent is water.

Suitable adhesion promoter substances are especially tetraalkoxy-silanes, organoalkoxysilanes, organotitanium compounds and organozirconium compounds, and mixtures thereof. Organoalkoxysilanes include, as well as the aminosilanes, epoxy silanes and mercaptosilanes already mentioned, especially (meth)acrylatosilane and vinylsilane, especially 3-(meth)acryloyloxy-propyltriethoxysilane, 3-(meth)acryloyloxypropyltrimethoxysilane, vinyl-trimethoxysilane and vinyltriethoxysilane.

Suitable organotitanium compounds are in principle all organotitanium compounds known to those skilled in the art which are used as adhesion promoters. The organotitanium compound preferably bears at least one group which is hydrolyzed under the influence of water and leads to the formation of a Ti—OH group. Such an organotitanium compound preferably bears at least one functional group which is selected from the group comprising alkoxy group, sulfonate group, carboxylate group, acetylacetonate or mixtures thereof, and which is bonded directly to a titanium atom via an oxygen-titanium bond.

Particularly suitable alkoxy groups have been found to be especially so-called neoalkoxy substituents. Particularly suitable sulfonic acids have been found to be especially aromatic sulfonic acids whose aromatic rings are substituted by an alkyl group, especially p-dodecylbenzenesulfonic acid. Particularly suitable carboxylate groups have been found to be especially carboxylates of fatty acids. A preferred carboxylate is considered to be decanoate.

Suitable organozirconium compounds are in principle all organozirconium compounds which are known to those skilled in the art and are used as adhesion promoters. The organozirconium compound preferably bears at least one group which is hydrolyzed under the influence of water and leads to the formation of a Zr—OH group. Such an organozirconium compound preferably bears at least one functional group which is selected from the group comprising alkoxy group, sulfonate group, carboxylate group, phosphate or mixtures thereof, and which is bonded directly to a zirconium atom via an oxygen-zirconium bond.

Particularly suitable alkoxy groups have been found to be especially isopropoxy and so-called neoalkoxy substituents. Particularly suitable sulfonic acids have been found to be especially aromatic sulfonic acids whose aromatic rings are substituted by an alkyl group, especially p-dodecylbenzenesulfonic acid. Particularly suitable carboxylate groups have been found to be especially carboxylates of fatty acids. A preferred carboxylate is considered to be stearate.

Organozirconium compounds and organotitanium compounds are commercially widely available, for example from Kenrich Petrochemicals or DuPont, such as NZ 38J, NZ TPPJ, KZ OPPR, KZ TPP, NZ 01, NZ 09, NZ 12, NZ 38, NZ 44, NZ 97 from Kenrich Petrochemicals, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA1, LICA 09, LICA 12, LICA 38, LICA 44, LICA 97, LICA 99, KR OPPR, KROPP2 from Kenrich Petrochemicals, or Tyzor® ET, TPT, NPT, BTM AA, AA-75, AA-95, AA-105, TE, ETAM or OGT from DuPont.

In one embodiment of the invention, the composition is an aqueous composition which, as well as the reaction product, comprises water, a surfactant and preferably an acid. A suitable acid is especially an organic acid having a pKa of less than 5. Especially suitable are organic carboxylic acids and sulfonic acids. Carboxylic acids especially include those which are selected from the group consisting of formic acid, acetic acid, propionic acid, trifluoroacetic acid, oxalic acid, malonic acid, succinic acid, maleic acid, fumaric acid and citric acid, and also amino acids, especially aspartic acid and glutamic acid. Preference is given to acids which have a $pK_a$ between 4.0 and 5. Owing to their $pK_a$ such acids possess an excellent buffer action in the pH range of 3.5 to 4.5 of the aqueous composition, which is optimal for the present invention. As is well known, the chemist understands "$pK_a$" to mean the negative decadic logarithm of the acid dissociation constant $K_a$: $pK_a = -\log_{10} K_a$. A preferred carboxylic acid is acetic acid.

Organic sulfonic acids are understood to mean compounds which have an organic radical having carbon atoms and at least one functional group —$SO_3H$. In particular, these are aromatic sulfonic acids which are mono- or polycyclic and may have one or more sulfonic acid groups. For example, they may be 1- or 2-naphthalenesulfonic acid, 1,5-naphthalenedisulfonic acid, benzenesulfonic acid or alkylbenzenesulfonic acids. Preferred aromatic sulfonic acids are p-alkylbenzenesulfonic acids, especially p-toluenesulfonic acid and p-dodecylbenzenesulfonic acid.

The composition is outstandingly suitable as an adhesion promoter and can be used widely. More particularly, it can be used as a primer or as a primer constituent. A primer is understood to mean an undercoat which is applied to a surface and, after a certain wait time after application, the so-called flash off time, is covered by an adhesive or sealant or a coating, and serves to improve the adhesion of the adhesive or sealant or of the coating on the substrate surface in question.

Typically, such a primer comprises a binder, which is preferably a reactive binder, especially based on epoxy or isocyanate.

However, the composition can also be used as an adhesion promoter in an adhesive or sealant or a coating. It is especially suitable for use in an adhesive or sealant.

For the use of the composition as a primer, there are various means of application:

In a first process for adhesive bonding or sealing, it comprises the following steps:
 i) applying the composition described to a substrate S1 to be adhesive bonded or sealed ii) applying an adhesive or sealant to the composition which is present on the substrate S1 and has flashed off iii) contacting the adhesive or sealant with a second substrate S2.

In a second process for adhesive bonding or sealing, it comprises the following steps:

i') applying the composition described to a substrate S1 to be adhesive bonded or sealed ii') applying an adhesive or sealant to the surface of a second substrate S2 iii') contacting the adhesive or sealant with the composition which is present on the substrate S1 and has flashed off.

In a third process for adhesive bonding or sealing, it comprises the following steps:

i") applying the composition described to a substrate S1 to be adhesive bonded or sealed ii") flashing off the composition iii") applying an adhesive or sealant between the surfaces of the substrates S1 and S2.

In all of these three possibilities, the second substrate S2 consists of a material which is the same as or different than substrate S1.

Step iii), iii') or iii") is typically followed by a step for curing the adhesive or sealant. The person skilled in the art understands that, according to the system used and reactivity of the adhesive, crosslinking reactions, and hence already the curing, can begin as early as during the application. However, the main part of the crosslinking and hence, in the narrower sense of the term, the curing takes place after the application, which is because problems otherwise also arise with the build up of adhesion to the substrate surface.

More particularly, at least one of the substrates S1 or S2 is glass or glass ceramic. More particularly, one substrate is glass or glass ceramic and the other substrate is a paint or a painted metal or a painted metal alloy. The substrate S1 or S2 is thus glass or glass ceramic, and substrate S2 or S1 is a paint or a painted metal or a painted metal alloy.

Useable adhesives or sealants are various adhesive or sealant systems. More particularly, they are moisture-curing adhesives or sealants based on prepolymers terminated by isocyanate groups and/or alkoxysilane.

Suitable adhesives or sealants based on alkoxysilane-terminated prepolymers are one-component moisture-curing adhesives or sealants, the so-called MS polymers or alkoxysilane-terminated polyurethane prepolymers, especially those as prepared from polyols and isocyanates with subsequent reaction of an isocyanate-reactive organosilane or an isocyanate-functional organosilane.

Suitable adhesives or sealants based on isocyanate-terminated prepolymers are understood to mean firstly two-component polyurethane adhesives or sealants whose first component comprises an amine or a polyol and whose second component comprises an NCO-containing prepolymer or a polyisocyanate. Examples of such two-component room temperature curing polyurethane adhesives are those from the SikaForce® product line, as commercially available from Sika Schweiz AG.

Suitable adhesives or sealants based on isocyanate-terminated prepolymers are additionally understood to mean reactive polyurethane hotmelt adhesives or sealants which comprise a thermoplastic polymer and an isocyanate-terminated prepolymer or a thermoplastic isocyanate-terminated prepolymer. Such reactive polyurethane hotmelt substances are melted and firstly solidify in the course of cooling and secondly crosslink via a reaction with air humidity.

Suitable adhesives or sealants based on isocyanate-terminated prepolymers are additionally understood to mean one-component moisture-curing polyurethane adhesives. Such adhesives or sealants crosslink under the influence of humidity, especially of air humidity. Examples of such one-component moisture-curing polyurethane adhesives are those from SikaFlex® and SikaTack® product lines, as commercially available from Sika Schweiz AG.

The abovementioned isocyanate-terminated prepolymers are prepared from polyols, especially polyoxyalkylene polyols, and polyisocyanates, especially diisocyanates.

Preference is given to adhesives based on isocyanate-terminated prepolymers.

Most preferred are one-component moisture-curing polyurethane adhesives based on isocyanate-terminated prepolymers.

It has been found that, especially in the case of moisture-curing polyurethane adhesives or sealants, a great improvement in the adhesion can be achieved at low temperatures, i.e. especially at a temperature of less than 5° C., especially at a temperature between 5° C. and −20° C., using the composition described. It is obvious that aqueous compositions, owing to ice formation, are likely to be unsuitable for application temperatures of less than 0° C.

These adhesive bonding and sealing processes find use especially in the production of articles for industrial manufacture, especially of modes of transport. Such articles are especially automobiles, buses, trucks, rail vehicles, ships or aircraft.

The most preferred application is the glazing of modes of transport, especially of road and rail vehicles.

Owing to the excellent improvement in the adhesion of the adhesives and sealants at low temperatures, this process is suitable especially for glazing repairs. This is because it is possible to glaze vehicles on the street on site, especially also in winter, without the vehicle first having to be put into a temperature-controlled garage. This is important in particular for repairs to vehicle panes in remote areas, especially where the roads frequently have loose stones or gravel. Such areas are frequently to be found, for example, in Scandinavia, Russia, China, Argentina, Chile, Canada or the USA.

EXAMPLES

Compositions

The compositions according to Tables 2 and 3 were prepared by, if used, initially charging the aminosilane and the mercaptosilane, and then slowly adding the epoxy silane, if present, with stirring. Subsequently, the mixture was stirred for 4 days and ethyl acetate was added. In the comparative example, Ref. 7, triethylamine was added as a catalyst. After preparation, the compositions were transferred into closed glass bottles and stored at room temperature until shortly before application.

TABLE 1

| Abbreviations used | |
|---|---|
| A187 | 3-glycidyloxypropyltrimethoxysilane |
| A189 | 3-mercaptopropyltrimethoxysilane |
| A1110 | 3-aminopropyltrimethoxysilane |
| A1170 | bis(trimethoxysilylpropyl)amine |
| Et3N | triethylamine |
| EtOAc | ethyl acetate |

TABLE 2

Composition.

| | Ref. 2 | Ref. 3 | Ref. 4 | Ref. 5 | Ref. 6 | 1 | 2 | 3 |
|---|---|---|---|---|---|---|---|---|
| A1170 [% by wt.] | 8.02 | 4.37 | 8.74 | 10.00 | 8.53 | 7.90 | 8.63 | 9.34 |
| A189 [% by wt.] | 1.98 | 0.63 | 1.26 | | | 1.30 | 0.62 | 0.30 |
| A187 [% by wt.] | | | | | 1.47 | 0.80 | 0.75 | 0.36 |
| EtOAc [% by wt.] | 90.00 | 95.00 | 90.00 | 90.00 | 90.00 | 90.00 | 90.00 | 90.00 |
| [(I)]:[(II)]:[(III)] | 2.3:1:0 | 4:1:0 | 4:1:0 | 1:0:0 | 4:0:1 | 6.8:2:1 | 8:1:1 | 8:1:1 |

TABLE 3

Further compositions.

| | 4 | 5 | 6 | 7 | 8 | Ref. 7 |
|---|---|---|---|---|---|---|
| A1110 [% by wt.] | | 5.84 | | | | |
| A1170 [% by wt.] | 7.28 | | 4.41 | 2.74 | 4.53 | |
| A189 [% by wt.] | 2.09 | 3.20 | 2.54 | 1.57 | 3.90 | 4.54 |
| A187 [% by wt.] | 0.63 | 0.96 | 3.05 | 5.69 | 1.57 | 5.46 |
| Et3N [% by wt.] | | | | | | 0.20 |
| EtOAc [% by wt.] | 90.00 | 90.00 | 90.00 | 90.00 | 90.00 | 90.00 |
| [(I)]:[(II)]:[(III)] | 8:4:1 | 8:4:1 | 1:1:1 | 1:1:3 | 2:3:1 | 0:1:1 |

The compositions were applied to the following substrates by means of a soaked lint-free Kleenex® tissue at the application temperature ("$T_{app}$") of 23° C. or −10° C., and flashed off during the flash off time ("$t_{FO}$")

| "Pane 1": | windshield of an Audi A4 (Sigla) (application to edge of glass ceramic) |
| "Pane 2": | windshield of a Toyota Starlet (Safevue) (application to edge of glass ceramic) |
| "Pane 3": | windshield of a Mazda 6 (Guardian) (application to edge of glass ceramic) |
| Float glass, tin side: | Rocholl GmbH, Germany |

Both the compositions and the substrates were conditioned over at least 12 hours at the application temperature.

Ref. 1 is Sika® activator, commercially available from Sika Schweiz AG.

After the flash off time had expired, at the application temperature of, SikaTack® Move Goes Cool, or SikaTack® Drive (both commercially available from Sika Schweiz AG), were applied as a triangular bead (base 12 mm, height 8 mm) and pressed to a layer thickness of 4 mm by means of baking paper.

The Adhesive was Cured as Follows:
1 day of storage at the application temperature
6 days at 23° C./50% rel. air humidity Thereafter, the adhesion of the adhesive was assessed by means of the bead test ("CC"—climate-controlled storage).

Subsequently, the further storage periods were conducted and the adhesion was likewise assessed by means of the bead test:

7 days under water (23° C., "W"—water storage)
7 days at 70° C./100% rel. air humidity ("HH"—heat and humidity)

Adhesion Test ("Bead Test")

The adhesion of the adhesive was tested by means of the 'bead test'. This test involves incising at the end just above the adhesive surface. The incised end of the bead is held with rounded-end tweezers tweezers and pulled from the substrate. This is done by carefully rolling up the bead onto the tip of the tweezers, and placing a cut at right angles to the direction of bead pulling down to the bare substrate. The bead pulling rate should be selected such that a cut has to be made about every 3 seconds. The test distance must be at least 8 cm. After the bead has been pulled off, adhesive remaining on the substrate is assessed (cohesion fracture). The adhesion properties are assessed by estimating the cohesive component of the adhesive surface:

1=>95% cohesion fracture
2=75-95% cohesion fracture
3=25-75% cohesion fracture
4=<25% cohesion fracture
5=0% cohesion fracture (purely adhesive fracture)

Test results with cohesion fracture values of less than 75% are considered to be inadequate. The results are compiled in Tables 3, 4, 5 and 6.

TABLE 3

Adhesion results of SikaTack ®-Move Goes Cool on pane 1.

| | 23° C. ($T_{app}$) | | | | | | −10° C. ($T_{app}$) | | | | | |
|---|---|---|---|---|---|---|---|---|---|---|---|---|
| | 3 min. ($t_{FO}$) | | | 10 min. ($t_{FO}$) | | | 5 min. ($t_{FO}$) | | | 20 min. ($t_{FO}$) | | |
| | CC | W | HH | CC | W | HH | CC | W | HH | CC | W | HH |
| Ref. 1 | 5 | 4 | 1 | 5 | 1 | 1 | 5 | 5 | 1 | 5 | 4 | 1 |
| Ref. 2 | 5 | 5 | 4 | 1 | 1 | 1 | 4 | 4 | 3 | 1 | 2 | 1 |
| Ref. 3 | 5 | 4 | 1 | 1 | 1 | 1 | 5 | 5 | 4 | 1 | 3 | 3 |
| Ref. 4 | 3 | 1 | 1 | 1 | 1 | 1 | 3 | 3 | 1 | 1 | 3 | 1 |
| Ref. 5 | 4 | 5 | 3 | 2 | 2 | 1 | 5 | 5 | 5 | 3 | 5 | 1 |
| Ref. 6 | 5 | 5 | 5 | 3 | 3 | 3 | 5 | 5 | 5 | 5 | 5 | 1 |
| 1 | 3 | 3 | 1 | 1 | 1 | 1 | 4 | 5 | 2 | 1 | 1 | 1 |
| 2 | 2 | 2 | 3 | 1 | 1 | 1 | 5 | 5 | 4 | 2 | 2 | 5 |
| 3 | 5 | 5 | 2 | 4 | 5 | 1 | 5 | 5 | 5 | 2 | 2 | 1 |

TABLE 4

Adhesion results of SikaTack ®-Move Goes Cool on pane 2.

| | 23° C. ($T_{app}$) | | | | | | −10° C. ($T_{app}$) | | | | | |
|---|---|---|---|---|---|---|---|---|---|---|---|---|
| | 3 min. ($t_{FO}$) | | | 10 min. ($t_{FO}$) | | | 5 min. ($t_{FO}$) | | | 20 min. ($t_{FO}$) | | |
| | CC | W | HH | CC | W | HH | CC | W | HH | CC | W | HH |
| Ref. 1 | 5 | 4 | 1 | 4 | 2/3 | 1 | 5 | 5 | 3 | 5 | 5 | 1 |
| Ref. 2 | 2 | 2 | 1 | 1 | 1 | 1 | 4 | 5 | 4 | 3 | 2 | 1 |
| Ref. 3 | 1 | 1 | 1 | 1 | 1 | 1 | 5 | 5 | 4 | 4 | 4 | 1 |
| Ref. 4 | 2 | 1 | 1 | 1 | 1 | 1 | 5 | 5 | 3 | 2 | 1 | 1 |
| Ref. 5 | 2 | 1 | 1 | 3 | 2 | 2 | 5 | 5 | 3 | 2 | 1 | 1 |
| Ref. 6 | 3 | 1 | 1 | 1 | 1 | 1 | 5 | 5 | 4 | 5 | 4 | 2 |

TABLE 4-continued

Adhesion results of SikaTack®-Move Goes Cool on pane 2.

| | 23° C. ($T_{app}$) | | | | | | -10° C. ($T_{app}$) | | | | |
|---|---|---|---|---|---|---|---|---|---|---|---|
| | 3 min. ($t_{EO}$) | | | 10 min. ($t_{EO}$) | | | 5 min. ($t_{EO}$) | | | 20 min. ($t_{EO}$) | | |
| | CC | W | HH | CC | W | HH | CC | W | HH | CC | W | HH |
| 1 | 1 | 3 | 2 | 1 | 1 | 1 | 1 | 2 | 1 | 1 | 1 | 1 |
| 2 | 1 | 1 | 1 | 1 | 1 | 1 | 1 | 1 | 2 | 2 | 1 | 2 |
| 3 | 1 | 1 | 1 | 1 | 1 | 1 | 5 | 5 | 2 | 2 | 2 | 1 |

TABLE 5

Adhesion results on pane 3 ($T_{app}$ = 23° C.).

| | SikaTack®-Drive | | | | | | SikaTack®-Move Goes Cool | | | | | |
|---|---|---|---|---|---|---|---|---|---|---|---|---|
| | 3 min. ($t_{EO}$) | | | 10 min. ($t_{EO}$) | | | 3 min. ($t_{EO}$) | | | 10 min. ($t_{EO}$) | | |
| | CC | W | HH | CC | W | HH | CC | W | HH | CC | W | HH |
| 4 | 1 | 1 | 3 | 1 | 2 | 5 | 1 | 1 | 2 | 1 | 1 | 5 |
| 5 | 1 | 1 | 1 | 1 | 5 | 1 | 1 | 1 | 4 | 1 | 5 | 3 |
| 6 | 1 | 1 | 1 | 1 | 1 | 1 | 1 | 1 | 1 | 1 | 1 | 1 |
| 7 | 1 | 1 | 1 | 1 | 1 | 1 | 1 | 1 | 1 | 1 | 1 | 1 |
| 8 | 1 | 1 | 1 | 1 | 1 | 1 | 1 | 1 | 1 | 1 | 1 | 1 |
| Ref. 1 | 1 | 1 | 1 | 1 | 1 | 1 | 1 | 1 | 1 | 1 | 1 | 1 |
| Ref. 7 | 5 | 1 | 1 | 4 | 3 | 1 | 5 | 5 | 3 | 5 | 4 | 1 |

TABLE 6

Adhesion results on float glass (tin side) ($T_{app}$ = 23° C.).

| | SikaTack®-Drive | | | | | | SikaTack®-Move Goes Cool" | | | | | |
|---|---|---|---|---|---|---|---|---|---|---|---|---|
| | 3 min. ($t_{EO}$) | | | 10 min. ($t_{EO}$) | | | 3 min. ($t_{EO}$) | | | 10 min. ($t_{EO}$) | | |
| | CC | W | HH | CC | W | HH | CC | W | HH | CC | W | HH |
| 4 | 2 | 1 | 1 | 1 | 5 | 1 | 1 | 1 | 1 | 3 | 5 | 1 |
| 5 | 1 | 1 | 1 | 1 | 1 | 1 | 1 | 3 | 1 | 1 | 3 | 1 |
| 6 | 1 | 1 | 1 | 1 | 1 | 1 | 2 | 1 | 1 | 2 | 3 | 1 |
| 7 | 1 | 1 | 1 | 1 | 1 | 1 | 2 | 1 | 1 | 1 | 1 | 1 |
| 8 | 2 | 1 | 1 | 2 | 1 | 2 | 2 | 1 | 1 | 2 | 3 | 1 |
| Ref. 1 | 3 | 2 | 1 | 1 | 1 | 1 | 4 | 4 | 1 | 3 | 3 | 1 |
| Ref. 7 | 2 | 1 | 1 | 1 | 1 | 1 | 4 | 4 | 1 | 5 | 5 | 2 |

The results show that the inventive compositions are very suitable as adhesion promoters. In addition, the advantageous effect of the secondary aminosilanes over the primary aminosilanes is shown.

More particularly, they show the advantageous suitability for use in low-temperature application.

The invention claimed is:

1. A composition comprising:
   a solvent; and
   at least one reaction product obtained from a reaction mixture comprising:
   at least one aminosilane of the formula (I)

$$R^1\text{---}[Si(OR^2)_{(3-a)}(R^3)_a]_n; \quad (I)$$

at least one mercaptosilane of the formula (II)

$$R^{1'}\text{---}[Si(OR^{2'})_{(3-b)}(R^{3'})_b]_m; \text{ and} \quad (II)$$

at least one epoxy silane of the formula (III)

$$R^{1''}\text{---}[Si(OR^{2''})_{(3-c)}(R^{3''})_c]_p; \quad (III)$$

where $R^1$ is an n-valent organic radical with at least one primary and/or secondary amino group,
$R^{1'}$ is an m-valent organic radical with at least one mercapto group,
$R^{1''}$ is a p-valent organic radical with at least one epoxy group,
$R^2$, $R^{2'}$ and $R^{2''}$ are each independently an alkyl group having 1 to 4 carbonatoms,
$R^3$, $R^{3'}$ and $R^{3''}$ are each independently H or an alkyl group having 1 to 10 carbonatoms,
a, b and c are each independently 0, 1 or 2, and
n, m and p are each independently 1, 2, 3 and 4.

2. The composition as claimed in claim 1, wherein a is 0 and $R^2$ is methyl or ethyl.

3. The composition as claimed in claim 1, wherein b is 0 and $R^{2'}$ is methyl or ethyl.

4. The composition as claimed in claim 1, wherein c is 0 and $R^{2''}$ is methyl or ethyl.

5. The composition as claimed in claim 1, wherein m and p are each 1 and n is 1 or 2.

6. The composition as claimed in claim 1, wherein the aminosilane has the formula (IV) or (V) or (VI) or (VII)

$$H_2N\text{---}R^4\text{---}Si(OR^2)_{(3-a)}(R^3)_a \quad (IV)$$

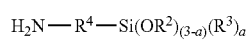   (V)

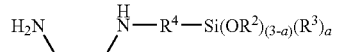   (VI)

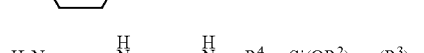   (VII)

where $R^4$ is a linear or branched alkylene group having 1 to 6 carbon atoms.

7. The composition as claimed in claim 1, wherein the mercaptosilane has the formula (VIII)

$$HS\text{---}R^{4'}\text{---}Si(OR^{2'})_{(3-b)}(R^{3'})_b \quad (VIII)$$

where $R^{4'}$ is a linear or branched alkylene group having 1 to 6 carbon atoms.

8. The composition as claimed in claim 1, wherein the epoxy silane has the formula (IX) or (X)

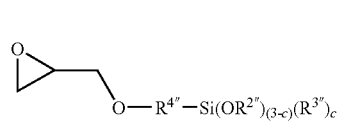   (IX)

(X)

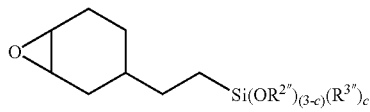

where R<sup>4"</sup> is a linear or branched alkylene group having 1 to 6 carbon atoms.

9. The composition as claimed in claim 1, wherein the solvent is an organic solvent.

10. The composition as claimed in claim 1, wherein the solvent is water.

11. The composition as claimed in claim 1, wherein the composition further comprises a surfactant.

12. The composition as claimed in claim 1, wherein the composition further comprises an acid.

13. The composition as claimed in claim 1, wherein the epoxy silane of the formula (III) is used in a substoichiometric amount in relation to the mercaptosilane of the formula (II).

14. The composition as claimed in claim 1, wherein the aminosilane of the formula (I), the mercaptosilane of the formula (II) and the epoxy silane of the formula (III) are used in such a ratio that the number of epoxy groups is equal to or greater than the sum of the number of mercapto groups and the number of primary amino groups.

15. The composition as claimed in claim 1, wherein the reaction product comprises at least one compound of the formula (XI)

(XI)

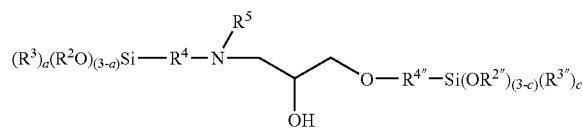

where $R^5$ is H, a $C_1$-$C_{20}$-alkyl, cycloalkyl or aryl radical, or a radical of the formula —$R^4$—$Si(OR^2)_{(3-a)}(R^3)_a$, and $R^4$ and $R^{4"}$ are each independently a linear or branched alkylene group having 1 to 6 carbon atoms.

16. The composition as claimed in claim 1, wherein the reaction product comprises at least one compound of the formula (XII)

(XII)

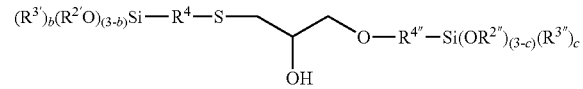

and $R^{4'}$ and $R^{4"}$ are each independently a linear or branched alkylene group having 1 to 6 carbon atoms.

17. The composition as claimed in claim 1, wherein the reaction product comprises at least one compound with at least one structural element of the formula (XIII) and at least one compound with the structural element of the formula (XIV)

(XIII)

----S\~\~\~/\~\~\~
     |
     OH (XIV)

----N(R<sup>5</sup>)\~\~\~/\~\~\~
     |
     OH where $R^5$ is H, a $C_1$-$C_{20}$-alkyl, cycloalkyl or aryl radical, or a radical of the formula —$R^4$—$Si(OR^2)_{(3-a)}(R^3)_a$.

18. The composition as claimed in claim 1, wherein the reaction product comprises at least one compound with at least one structural element of the formula (XIII) and at least one compound with the structural element of the formula (XV)

(XII)

----S\~\~\~/\~\~\~
     |
     OH (XV)

----N(\~\~\~OH)(\~\~\~OH)

19. A process for preparing a composition as claimed in claim 1, wherein the aminosilane of the formula (I) and the mercaptosilane of the formula (II) are initially charged and then the epoxy silane of the formula (III) is added.

20. The composition as claimed in claim 1, wherein the composition is an adhesion promoter.

21. The composition as claimed in claim 1, wherein the composition is a primer.

22. The composition as claimed in claim 1, wherein the composition is an adhesion promoter in an adhesive or sealant.

23. A process for improving the adhesion of a one-component moisture-curing polyurethane adhesive or sealant at a temperature of less than 5° C., the process comprising applying a composition as claimed in claim 1 to a substrate.

24. A process for adhesive bonding or for sealing, comprising the steps of
   i) applying a composition as claimed in claim 1 to a substrate S1 to be adhesive bonded or sealed,
   ii) applying an adhesive or sealant to the composition which is present on the substrate S1 and has flashed off, and
   iii) contacting the adhesive or sealant with a second substrate S2; or
   i') applying the composition to a substrate S1 to be adhesive bonded or sealed,
   ii') applying an adhesive or sealant to the surface of a second substrate S2, and
   iii') contacting the adhesive or sealant with the composition which is present on the substrate S1 and has flashed off;
   or
   i") applying the composition to a substrate S1 to be adhesive bonded or sealed,
   ii") flashing off the composition, and iii") applying an adhesive or sealant between the surfaces of the substrates S1 and S2, the second substrate S2 consisting of a material which is the same as or different than the substrate S1.

25. The process as claimed in claim 24, wherein step iii), iii') or iii") is followed by a step iv) for curing the adhesive or sealant.

26. The process as claimed in claim 24, wherein step i), i') or i") is performed at a temperature of 5° C. to −20° C.

27. The process as claimed in claim 24, wherein at least one of the substrates S1 or S2 is glass or glass ceramic.

28. The process as claimed in claim 24, wherein the substrate S1 or S2 is glass or glass ceramic and the substrate S2 or S1 is a paint or a painted metal or a painted metal alloy.

29. An article produced by performing a process as claimed in claim 23.

30. The article as claimed in claim 29, wherein the article is a mode of transport, especially an automobile, bus, truck, rail vehicle, ship or aircraft.

* * * * *